No. 715,491. Patented Dec. 9, 1902.
A. LINDGREN.
CORN PLANTING MACHINE.
(Application filed June 9, 1902.)

(No Model.) 4 Sheets—Sheet 1.

WITNESSES
INVENTOR
August Lindgren
By P. Dodge
Attorney

No. 715,491. Patented Dec. 9, 1902.
A. LINDGREN.
CORN PLANTING MACHINE.
(Application filed June 9, 1902.)

(No Model.) 4 Sheets—Sheet 3.

WITNESSES
INVENTOR
August Lindgren
By P. T. Dodge
Attorney

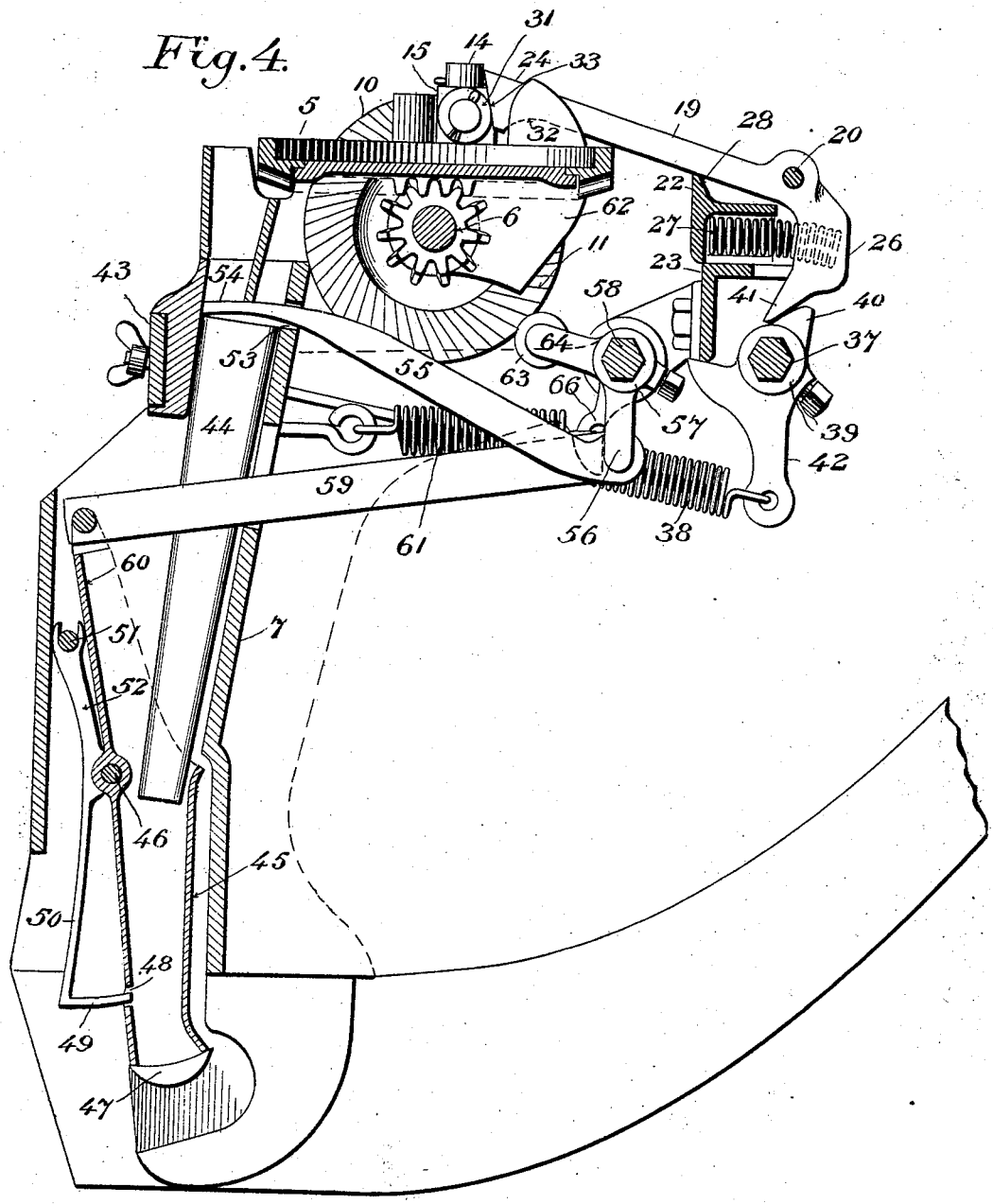

UNITED STATES PATENT OFFICE.

AUGUST LINDGREN, OF MOLINE, ILLINOIS, ASSIGNOR TO THE MOLINE PLOW COMPANY, A CORPORATION OF ILLINOIS.

CORN-PLANTING MACHINE.

SPECIFICATION forming part of Letters Patent No. 715,491, dated December 9, 1902.

Application filed June 9, 1902. Serial No. 110,820. (No model.)

*To all whom it may concern:*

Be it known that I, AUGUST LINDGREN, of Moline, county of Rock Island, and State of Illinois, have invented a new and useful Improvement in Corn-Planting Machines, of which the following is a specification.

This invention relates to corn-planters, and particularly to check-row planters of the type wherein the seed-discharging mechanism is operated from the ground or covering wheels and its time of operation controlled by the check-line. Machines of this type embody usually intergear mechanism between the ground-wheels and the seed-discharging mechanism, which intergear mechanism includes a clutch device adapted to be operated by the knots on the check-line and acting to connect the ground-wheels operatively with the seed-discharging mechanism periodically, corresponding with the successive knots, the construction of the clutch being such that the seeding mechanism will be automatically thrown out of action after it has operated for a period sufficient to discharge the requisite number of grains for a hill. It is also usual in machines operating in this manner to control the passage of the seed into the ground by means of coöperating valves arranged in the seed tube or conduit, the aim being to permit the individual grains from the seed mechanism to accumulate in quantities sufficient for a hill and then to discharge them together into the ground.

The present invention consists of a clutch mechanism of improved form and construction in combination with improved devices by which it is controlled in its action by the check-line mechanism, whereby the check-line will perform only the function of initiating the action of the seed mechanism and will consequently be subject to a minimum amount of strain or pull.

The invention consists also of a valve mechanism of improved form and arrangement for controlling the passage of the seed from the seeding mechanism to the ground, by which the kernels to form a hill are accumulated in uniform quantities and deposited with certainty at equal intervals.

The invention consists also in an improved means for operating the valve mechanism from power derived from the ground-wheels.

The invention consists also in the details of construction and combination of parts hereinafter described and claimed.

Figure 1:
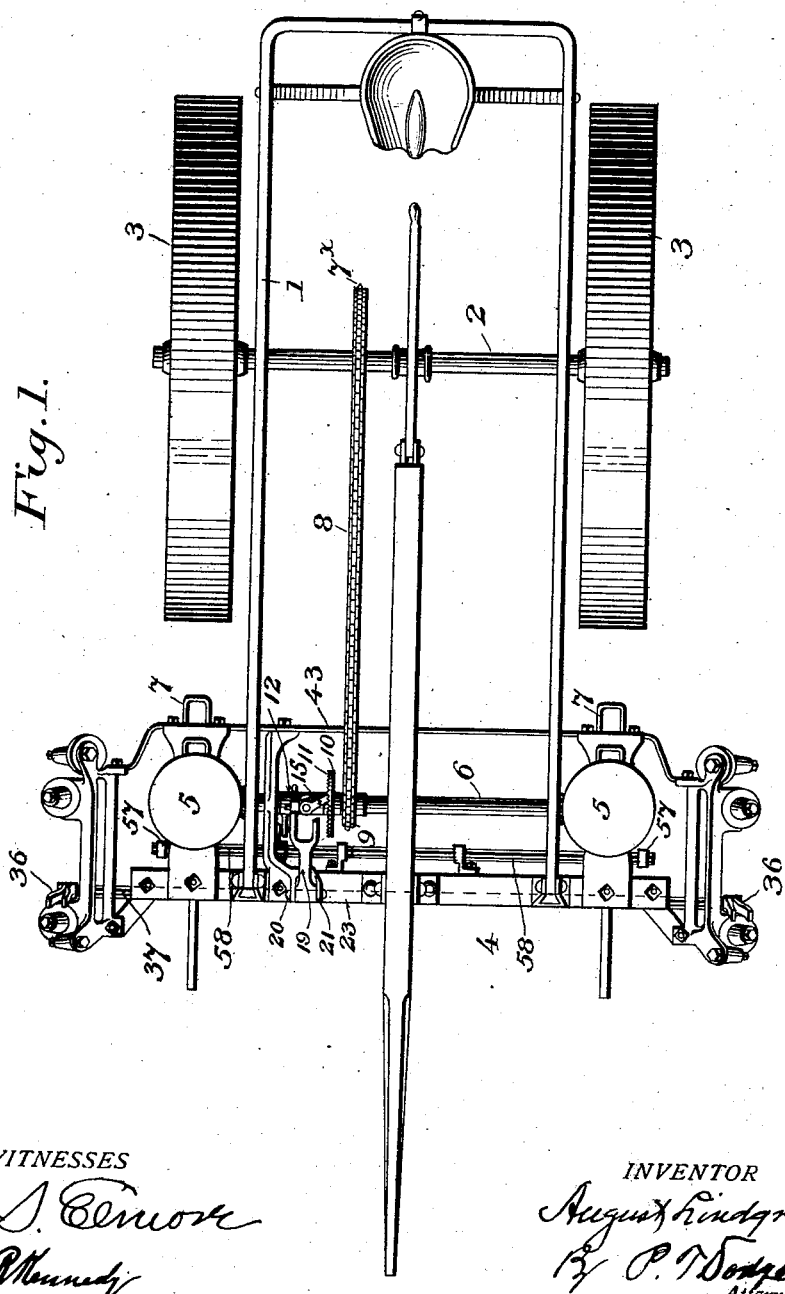
Figure 2:
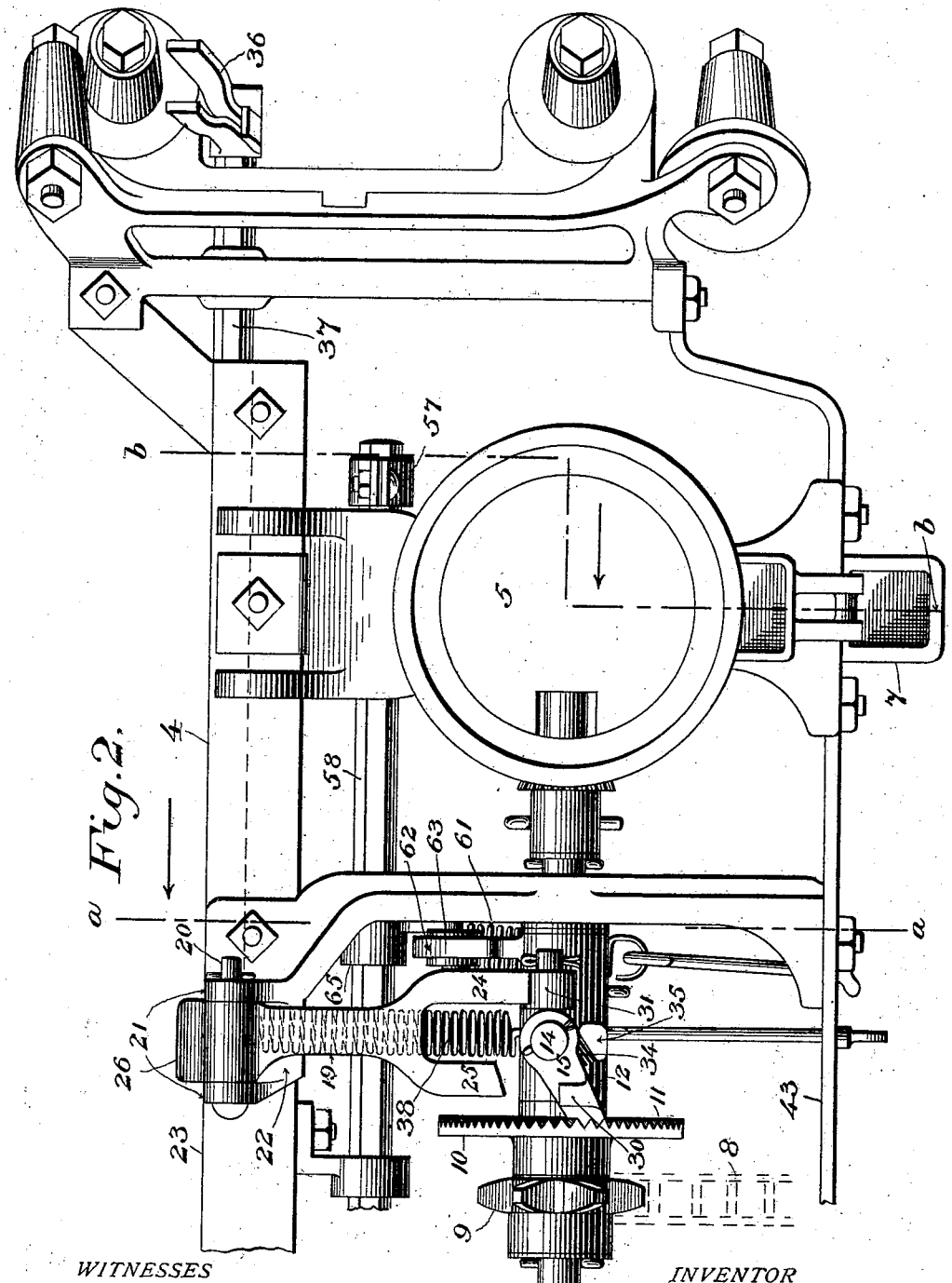
Figure 3:
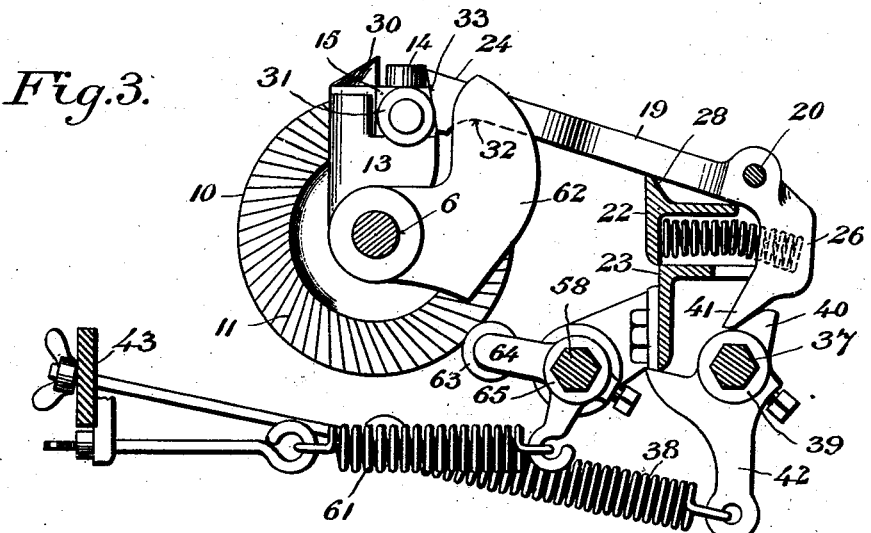
Figure 5:
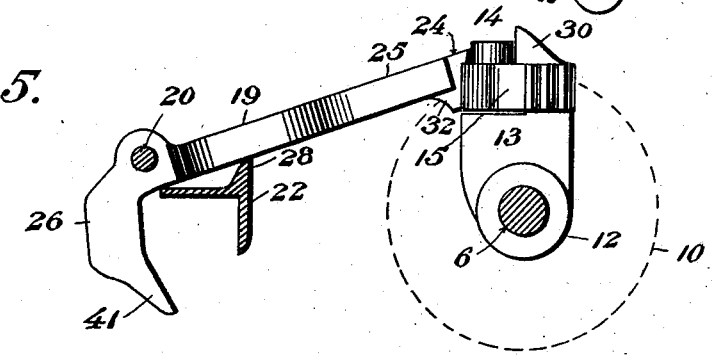
Figure 6:
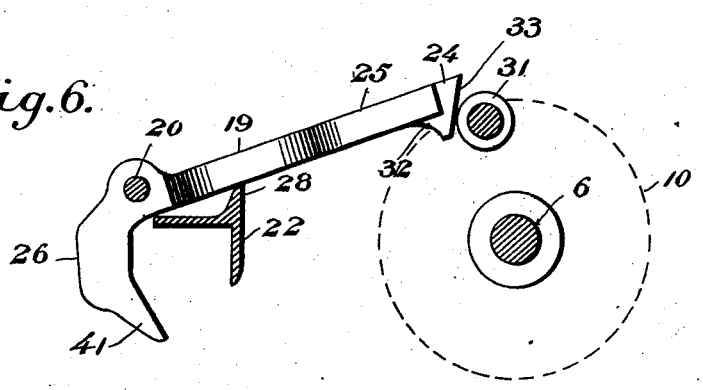

In the accompanying drawings, Figure 1 is a top plan view of a corn-planting machine having my invention embodied therein. Fig. 2 is a top plan view, on an enlarged scale, of the runner-frame of the machine, showing particularly the clutch mechanism, its controlling devices, and adjacent parts. Fig. 3 is a vertical longitudinal sectional elevation on the line *a a* of Fig. 2 as viewed in the direction of the arrow in Fig. 2. Fig. 4 is a vertical longitudinal sectional elevation on the line *b b* of Fig. 2 through the seed tube or conduit, showing the form of the valve mechanism therein and showing in elevation the relation of the clutch mechanism and other coöperating parts. Fig. 5 is a side elevation of the locking-lever for the clutch-dog, showing the relation of the parts just previous to the engagement of the dog with the lever to effect the disconnection of the clutch; and Fig. 6 is a sectional elevation on the line *c c* of Fig. 2, showing how the locking-lever effects a movement of the clutch-dog independent of that by which it was disengaged.

Referring to the drawings, 1 represents the wheel-frame of the machine, mounted on the axle 2, sustained by the usual covering or ground wheels 3. At its front the frame has jointed to it the usual runner-frame 4, sustaining seedboxes 5, each provided in its bottom with seed-discharging mechanism, which mechanism is operated by a transverse driving-shaft 6 and which discharges into the upper ends of vertical seed-conduits 7, by which the seed is directed to the ground.

The discharge of the seed through the conduits is controlled by a valve mechanism of such form that the individual grains delivered by the seed-discharging mechanism are accumulated in sufficient quantities to form a hill and at predetermined times are dropped together into the ground. This valve mechanism is of improved form and is operated in an improved manner, as will be more fully described hereinafter.

On the axle of the machine is fixed a sprocket-wheel 7×, which is connected by a sprocket-chain 8 with a sprocket-wheel 9, mounted loosely on the driving-shaft 6, the result being that the wheel 9 will be rotated constantly from the axle of the machine as the latter advances over the field. Fixed to the hub of the wheel 9 and rotatable with it is a clutch-disk 10, having on its side face near its edge a series of radial clutch-teeth 11, and adjacent to this clutch-disk a collar 12 is fixed to the driving-shaft and is provided with a radial arm 13, having projecting from it a stud 14, on which is loosely mounted between its ends a rocking clutch-dog 15 in such relation to the face of the disk that one end of the dog may swing into and out of engagement with the disk and in this manner serve as a means for transmitting the motion of the disk to the collar 12 and through it to the driving-shaft. The end of the dog which is adapted thus to be engaged with the disk is notched, in which notch one of the teeth on the disk will extend when the dog is engaged and by this means will be caused to rotate bodily with the disk and will impart a corresponding motion to the driving-shaft, by which the dropping mechanism will be operated. The clutch mechanism is of such form that after it is operated to thus connect the driving-shaft it will maintain the connection until the shaft has made a complete revolution, whereupon the clutch will automatically effect the disconnection of the shaft and the parts will be locked in this disconnected position until at the proper time the clutch is again operated to effect the connection. These actions of the clutch are controlled by a single member, which is so constructed and arranged with relation to the clutch-dog that it will cause the same at the completion of the revolution of the clutch to be automatically rocked out of engagement with the clutch-disk and will lock the parts in this position. This member is in the form of a horizontal fore-and-aft lever 19, mounted at its forward end on a horizontal transverse axis 20, between ears 21 on a casting 22, fixed firmly to a cross-bar 23 on the runner-frame. The lever extends rearwardly from its axis and is provided on its end with two fingers 24 and 25, lying on opposite sides of the axis of the clutch-dog, as shown in Fig. 2. Beyond its axis the lever is formed with an angular downward extension 26, which is acted on at its rear side by a spiral spring 27, seated in the casting 22, which spring tends to hold the lever yieldingly in a horizontal position in contact with a stop 28, rising from the casting in rear of the axis of the lever, in which position the end of the finger 25 will lie in the path of a lug 30 on the side of the clutch-dog to one side of its axis as the clutch-dog is carried around with the clutch-disk, while the end of the finger 24 will lie in the path of a roller 31 on the end of the clutch-dog at the opposite side of its axis.

The function of finger 25 is to rock the clutch-dog on its axis when the lug 30 thereon engages the finger, and thus throw its notched end out of engagement with the clutch-disk, while the function of finger 24 is to act on the roller 31 on the dog after the latter has been disengaged from the clutch-disk and by a pressure on the roller to continue the motion of the dog on its axis independently of its first movement by the other finger. This additional movement of the dog by finger 24 is to carry its notched end wholly free of the disk, so that there will be no danger of it rocking back after once being disengaged, and the finger effects this additional movement by reason of the form of its under surface, which is curved, as at 32, and has an inclined or beveled end, as at 33, Fig. 6, the engagement of the roller with the beveled end acting to lift the lever on its axis against the influence of spring 27 until the lower edge of the beveled end is at the top of the roller, when the spring acting on the lever will urge the finger downward and force its curved surface into engagement with the roller and quickly move the same bodily, thereby rocking the dog on its axis. This action of finger 24 on the roller takes place just after the lug 30 has engaged the end of finger 25, which finger is so formed in relation to the lug that they will maintain their engagement with each other notwithstanding the vertical movement of the lever due to the roller acting on the finger 24. If the construction were otherwise and the slight vertical movement effected by the roller would disengage finger 25 from the lug, the dog would immediately reëngage with the disk and would not be held out of action. It is seen, therefore, that from the peculiar construction described the clutch-dog is first disengaged from the clutch-disk by a slight movement on its axis and is thereafter by independent means moved farther on its axis and its notched end carried a considerable distance from the disk, and in this position it is held and locked by the joint action of finger 25 and lug 30 and the position of the roller 31 with relation to the curved surface of finger 24. This is the normal position of the parts, and when in this position the driving-shaft is at rest and the clutch-dog is held against the influence of a spring 34, Fig. 2, which is seated between a projection 35 on collar 12 and the rear edge of the dog and tends to constantly throw the dog on its axis toward the clutch-disk.

At predetermined times the locking-lever 19 is tripped free of the dog, so as to permit the dog to be rocked on its axis by its spring and to engage the disk and effect the operation of the driving-shaft. I propose to effect this tripping of the lever by a check-line having the usual knots, which are adapted to act successively on a check-fork 36 and through suitable connections to momentarily lift the locking-lever free of the clutch-dog. As shown in Figs. 2 and 4, this check-fork 36 is fixed in a vertical position at the side of the machine on the end of a rock-shaft 37, which is mounted in suitable bearings on the transverse frame-bar 23, and the fork is of the familiar form in which the engagement of the knots of the line will throw it rearward as the machine advances, and their disengagement from the fork will permit the same to be returned to its former position by a returning-spring 38, these movements of the fork resulting in a series of successive rockings of the shaft at intervals corresponding to the distance between the knots on the line.

At a point vertically beneath the locking-lever the rock-shaft 37 has fixed to it a sleeve 39, having extending upwardly from it a nose-piece 40, which is adapted to engage a tailpiece 41 on the downwardly-extending angular extension of the locking-lever, the arrangement being such that when the shaft is rocked by the rearward throw of the check-fork the nose-piece will be thrown rearward and will force the tailpiece forward, thereby rocking the locking-lever on its axis and elevating its rear end, which action will release the clutch-dog and permit its spring 34 to throw the same into engagement with the clutch-disk. On the disengagement of the knot with the check-fork the shaft is returned to its former position by means of the spring 38, before alluded to, which spring is connected at its forward end to an arm 42, depending from the sleeve 39, and connected at its opposite end to a cross-bar 43 on the rear of the runner-frame. This return of the shaft carries the nose-piece forward again and permits the locking-lever to be restored to its former position by its spring 27. From this description it will be seen that as the machine advances across the field the knots on the line engaging the check-fork successively will act to successively trip the locking-lever and effect the engagement of the seeding mechanism with the ground-wheels, the locking-lever after each releasing action returning to its former position in the path of the clutch-dog, which latter as it is carried around by the clutch-disk will engage the locking-lever and will be rocked on its axis and effect the disconnection of the shaft.

It will be noted that the tailpiece on the locking-lever and the nose-piece on the check-fork shaft are wholly disconnected from each other, which construction permits the locking-lever to yield in the act of effecting the disconnection of the clutch without affecting the operation or position of the check-shaft and the parts connected therewith. The only function, therefore, that the check-line performs is to initiate the operation of the seeding mechanism—that is to say, the engagement of the knots on the line with the check-fork acts to release a clutch-dog, which when released will effect the operative connection of the ground-wheels with the seeding mechanism, and the latter will be operated wholly from the ground-wheels. The strain on the check-line is thereby reduced to a minimum, so that there will be a total absence of side draft on the machine, and other advantages will result which are unnecessary to enumerate.

In the use of mechanism such as described, where the seed-dropping mechanism is operated periodically, it is usual to control the deposit of the seed into the ground by a valve mechanism situated in the seed tubes or conduits and of such form as to receive the individual grains delivered by the dropper-plates until a sufficient number have accumulated—usually three—to form a hill and then by periodical actions of the valve mechanism to drop the accumulated seeds into the ground at the points where the hill is to be located. I have designed for this purpose a valve mechanism of peculiar form and construction, which is operated periodically from power derived indirectly from the ground-wheels, and the construction of this mechanism is as follows: Situated in the upper part of the cast-iron conduit 7 is a seed-tube 44, formed, preferably, of galvanized iron, which terminates at its lower end a considerable distance from the lower end of the conduit and discharges into the upper end of a vertical elongated valve-chamber 45, situated in the lower part of the conduit and pivoted at its upper end on a horizontal transverse axis 46 within the conduit in such manner that its lower end, which is open, may be swung forward and closed over a fixed ledge 47 in the conduit, or it may be swung rearward free of the ledge, which actions will respectively close and open the bottom of the valve-chamber. Just above the fixed ledge the rear wall of the valve-chamber is slotted horizontally, as at 48, which slot is adapted when the chamber is swung rearward, as described, to open its lower end to receive a horizontal forwardly-extending fixed plate 49, which on the rearward movement of the chamber will extend into the same to its front wall and effectually close the chamber at this point. The fixed plate is carried on the lower end of a bar 50, which encircles the axis of the valve-chamber and which is held fixedly with relation to the valve-chamber by means of a horizontal pin 51 within the conduit, which pin extends between the fork end of an arm 52, forming an upward continuation of the bar. The function of the fixed plate 49 is to receive the seeds from the upper end of the conduit and prevent the same from passing to the ground when the valve-chamber is swung rearward to discharge the seed which was previously resting on the ledge 47, as will be more fully described hereinafter.

Just below its upper end the conduit is provided in its front wall with a slot 53, through which is adapted to be projected a flat plate 54, constituting a gate-valve, which is of a size to effectually close the upper end of the conduit and in this position to receive the seed delivered from the dropper-plate. This gate-valve is carried on the rear end of a rod 55, extending forward, where it is jointed to the end of an arm 56, depending from a collar 57, fixed on the end of a rock-shaft 58, which rock-shaft extends transversely of the runner-frame and is mounted in bearings thereon in rear of the check-shaft 37, before alluded to. This depending arm has also jointed to it the forward end of a link 59, which extends rearward through the front of the conduit at the side of the seed-tube therein and has its rear end jointed to the upper end of an extension 60, rising from the rocking valve-chamber 45, as clearly shown in Fig. 4. As a result of this construction the gate-valve in the upper end of the conduit and the swinging valve-chamber are operatively connected, so as to coöperate in the manner described. The rock-shaft 58 is acted on by a spiral spring 61, which tends to hold the shaft in such a position that the gate-valve will be projected into and will close the upper end of the conduit and the lower end of the valve-chamber will be swung forward and closed over the ledge 47, with the horizontal fixed plate 49 just entering the slot in the rear wall of the valve-chamber, and in this position any grains delivered from the dropper-plate will be received by the gate-valve and held there.

Assuming that by previous operations a charge of grains has been delivered to the valve-chamber and is being held by the ledge on its bottom and another charge is held by the gate-valve in the top of the conduit, if now the rock-shaft is operated to throw the depending arm 56 forward the gate-valve will be withdrawn and simultaneously the lower end of the valve-chamber will be swung rearward, causing the fixed plate 49 to close the chamber above its bottom. As a result of these actions the charge of grain held by the ledge will be pushed off the same and will enter the ground, the charge at the upper end of the conduit at the same time falling down through the seed-tube into the valve-chamber, where it will be received by the fixed plate 49 and there held until the return of the parts to their former positions, when the charge on the fixed plate will fall onto the ledge and the gate will again be projected into the upper end of the conduit ready to receive a second charge from the dropper-plate.

The valve mechanism described is operated through the medium of the clutch-sleeve 12, which has projecting from it at one side of the clutch-dog a cam 62, which when the sleeve is rotated by the clutch-disk will engage a roller 63 on an arm 64, projecting rearwardly from a collar 65 on the rock-shaft 58, the shape of the cam-surface being such that the arm will be forced downwardly by it and the shaft rocked, thereby throwing arm 56 forward, which action will, as hereinbefore described, open the gate-valve in the upper end of the conduit and swing the lower end of the valve-chamber rearward from over its closing ledge. On the disengagement of the cam-surface with the roller the rock-shaft will be quickly returned to its former position and the gate and the valve-chamber closed by means of the spiral spring 61, before alluded to, which has its forward end connected with an arm 66, depending from the sleeve 64, and has its rear end connected with the rear frame-bar 43.

The relation of the cam-surface to the clutch is such that the valves will be opened immediately after the driving-shaft has been connected with the ground-wheels, and when the charge of grain is deposited in the ground the valves are immediately closed, so that they are ready to receive the grain delivered by the dropper-plate. The delivery of grain then begins and continues for a single revolution of the driving-shaft, during which time the proper number of grains for the hill will be delivered by the dropper-plate and received by the gate-valve, after which the seed mechanism is automatically thrown out of gear and the parts locked in this position until the next knot on the check-line is encountered, whereupon the seed mechanism is again connected and the valves operated as before to deposit the charge into the ground.

I prefer to so gear the seed-plate that it will deposit the grain for one complete hill on the upper valve within a distance somewhat less than the length between the knots on the check-line. For instance, if the plate is geared to deposit one hill at a travel of twenty-eight inches over the ground a check-line with knots at intervals of three feet would give the mechanism time to complete its work before the next knot encounters the fork.

The dropper-plates are preferably of the "single-kernel" type, and inasmuch as under such conditions the last kernel would have such a limited time in traveling from the dropper-plate to the lower valve it has been found that an upper gate-valve, as described, is necessary.

Having thus described my invention, what I claim is—

1. In a planter the combination with the ground-wheels of a seed-discharging mechanism, operative connections between the two a clutch mechanism included in said operative connections, a check-line mechanism, a rock-shaft operated thereby, a locking-lever for the clutch mounted on an axis removed from the rock-shaft, and connections between the locking-lever and the rock-shaft; whereby the locking-lever may be rocked on its axis to release the clutch.

2. In a check-row planter the combination with the ground-wheels of a seed-discharging mechanism, operative connections between the two including a constantly-rotating clutch member operated from the ground-wheels, and a clutch-dog connected with the seeding mechanism and movable into engagement with the rotating clutch member, a locking-lever adapted to hold the clutch-dog disengaged and movable to release the same, a check-line mechanism, and a device operated thereby and arranged to engage the locking-lever but wholly disconnected therefrom.

3. In a check-row planter the combination with the ground-wheels, of a seed-discharging mechanism, operative connections between them including a rotary clutch member connected with the ground-wheels, and a clutch-dog connected with the seeding mechanism and movable into engagement with the rotary clutch member, a locking device adapted to hold the dog out of engagement with said member and movable to release the dog, an arm on said locking-lever, a check-line mechanism, a rock-shaft operated thereby, and a nose-piece on the rock-shaft adapted to engage the arm.

4. In a check-row planter the combination with the ground-wheels, of a seeding mechanism, a driving-shaft connected therewith, a clutch-disk mounted loosely on the driving-shaft and driven from the ground-wheels, a clutch-dog connected with the driving-shaft and movable into engagement with the disk, a locking-lever for the dog mounted on an axis parallel with the shaft and in front of the same and formed to engage and hold the dog disengaged from the clutch-disk, a spring bearing on the lever and tending to hold it in engagement with the disk, an arm depending from the lever, a check-line mechanism, a rock-shaft operated thereby, and a nose-piece on the rock-shaft in position to engage the arm on the lever and rock the latter on its axis to release the dog.

5. In a check-row planter, the combination with the ground-wheels of a seed-discharging mechanism, operative connections between the two including a constantly-rotating clutch member, and a clutch-dog mounted to rock to and from the clutch member on an axis transverse to that of said member, a check-line mechanism, and means controlled by said mechanism for governing the rocking action of the clutch-dog.

6. In a check-row planter the combination with the ground-wheels, of a seed-discharging mechanism, a driving-shaft geared thereto, a clutch-disk mounted loosely on the driving-shaft and driven constantly from the ground-wheels, a clutch-dog carried by the driving-shaft adjacent to the rotary clutch member and mounted to rock on an axis extending radially of the shaft, means tending to rock the dog into engagement with the clutch-disk, a movable device adapted to be engaged by the dog and rock the same out of engagement with the disk and to hold the same disengaged, a check-line mechanism, and means controlled by the said mechanism for moving said device to release the dog.

7. In a check-row planter, the combination with the ground-wheels, of a seed-discharging mechanism, operative connections between the two including a constantly-rotating clutch-disk, and a clutch-dog movable on an axis transversely of the axis of the disk to and from the same, a movable device adapted to be adjusted in the path of the dog and provided with two surfaces, one arranged to be engaged by the dog on one side of its axis, the other adapted to engage the dog on the opposite side of its axis and formed to continue the movement of the dog from the disk, the two surfaces being of such form with relation to the dog that they will hold the same disengaged, a check-line mechanism and means controlled by the same for moving the device to release the dog.

8. In a seeding-machine the combination with a seed-conduit, of a seed-discharging mechanism delivering into the upper end of the same, a valve mechanism in the upper end of the conduit arranged to receive and hold a charge of grain from the said mechanism, a valve mechanism in the lower end of the conduit controlling the deposit of the charge into the ground, means for operating said mechanisms simultaneously to permit the upper charge to descend in the conduit and the lower charge to enter the ground, and means for arresting the descent of the upper charge before it reaches the lower valve mechanism.

9. In a seeding-machine the combination with a seed-conduit, of mechanism delivering seed therein, a valve for opening and closing the upper end of the conduit, a valve for simultaneously opening and closing the lower end of the same, and means for closing the conduit between the two valves when they are opened.

10. In a seeding-machine the combination with a seed-conduit, of a rocking valve-chamber in its lower end, and a fixed seed-tube in the upper end of the conduit arranged to discharge into the rocking chamber.

11. In a seeding-machine the combination with a seed-conduit, of a rocking valve-chamber in its lower end, a fixed surface over which the chamber is adapted to close when swung forward, and a horizontal fixed plate adapted when the chamber is swung rearward to extend therein and close the same.

12. In a seeding-machine the combination with a seed-conduit, of a valve for opening and closing its upper end, a rocking valve-chamber in the lower end of the conduit, a fixed surface against which the chamber is adapted to close when it is swung forward at its lower end, a fixed plate adapted to extend in and close the chamber when it is swung rearward to open its lower end, and means for simultaneously opening the upper valve and swinging the chamber rearward.

13. In a seeding-machine the combination with a seed-conduit, of a rocking valve-chamber in its lower end adapted when rocked to open its lower end, a valve mechanism in the upper end of the conduit, an operating member common to both of said mechanisms, and connections between the same and said operating member formed to simultaneously open the upper valve, and to rock the valve-chamber to open its lower end.

14. In a check-row planter, the combination with the ground-wheels, of a seeding mechanism adapted to be operated thereby, a check-line mechanism, a clutch device controlled thereby and acting to connect the ground-wheels with the seeding mechanism, said clutch device including a clutch-collar on the driving-shaft, a seed-conduit into which the seed mechanism discharges, and a valve mechanism in said conduit operated by the rotation of the clutch-collar.

15. In a check-row planter, the combination with a seeding mechanism of a driving-shaft geared to the same, a seed-conduit, a valve mechanism therein, a rock-shaft operatively connected with the same, and a cam movable with the driving-shaft and adapted to engage and operate the rock-shaft and thereby actuate the valve mechanism.

16. In a check-row planter the combination with the ground-wheels, and seeding mechanism, of a driving-shaft geared thereto, intergear mechanism between the driving-shaft and the ground-wheels including a clutch member mounted loosely on the driving-shaft and driven from the ground-wheels, a clutch-collar fixed to the driving-shaft, mechanism for connecting the collar and clutch member, a seed-conduit, valve mechanism therein, and a cam on the clutch-collar adapted to operate said valve mechanism.

17. In a check-row planter the combination with the ground-wheels, of a seed-discharging mechanism, a driving-shaft geared to the same, a clutch mechanism adapted to connect the ground-wheels with the driving-shaft, a check-line mechanism controlling the operation of the clutch, a seed-conduit, a valve mechanism therein, a rock-shaft operatively connected with the valve mechanism, and a cam movable with the driving-shaft and adapted to engage the rock-shaft and operate the valve mechanism, said cam being arranged with relation to the clutch mechanism to effect the operation of the valves immediately on the connection of the ground-wheels with the seeding mechanism.

18. In a check-row planter the combination with a seed-conduit, of a seed-discharging mechanism to deliver into the upper end of the same, means for operating the said mechanism periodically, a valve in the upper end of the conduit to receive the seed discharged at each periodical operation of the seed mechanism, a valve in the lower end of the conduit adapted to receive the seed passing down through the same, an intermediate valve adapted to temporarily arrest the descent of the seed, means for simultaneously operating the upper and lower valves to discharge the seeds held by them, and the intermediate valve to arrest the descent of the upper charge, and means for quickly restoring the valves to their previous positions before the seed mechanism begins its delivery of grains.

19. In a check-row planter the combination with the ground-wheels, of a seeding mechanism, a driving-shaft geared to the same, a clutch-disk mounted loosely on the driving-shaft and geared to the ground-wheels, a clutch-sleeve fixed to the driving-shaft adjacent to the disk, a clutch-dog mounted between its ends on this sleeve on an axis extending radially from the shaft in such relation to the disk that one end of the dog may be engaged or disengaged therewith, a locking-lever mounted on a transverse axis parallel to the shaft and in front of the same, and provided with two fingers lying on opposite sides of the axis of the dog, a spring tending to hold the lever so that its fingers will extend in the path of the dog, one of said fingers being adapted to be engaged by one end of the dog and to rock the same free of the clutch-disk, and the other finger being adapted to be engaged by the other end of the dog and to continue the rocking motion of the same and formed to hold the dog disengaged, a check-line mechanism, and means operated thereby for moving the locking-lever to release the dog.

20. In a check-row planter the combination with the ground-wheels of a seeding mechanism, a clutch mechanism for operatively connecting the two, a check-line having knots to periodically actuate the clutch, said seeding mechanism being formed and geared to deliver the single grains for a complete hill during the travel of the machine a distance appreciably less than the intervals between the knots, a conduit into which the seeding mechanism delivers, a valve in the upper end of the same to receive the individual grains from the seeding mechanism, a coöperating valve in the lower part of the conduit, means for opening said valves to discharge the seed held by them immediately after the seeding mechanism is clutched to the ground-wheels, and means for closing the said valves before the seeding mechanism begins the delivery of the seed.

In testimony whereof I hereunto set my hand, this 15th day of May, 1902, in the presence of two attesting witnesses.

AUGUST LINDGREN.

Witnesses:
L. C. BLANDING,
C. H. LIPPINCOTT.